United States Patent

[11] 3,537,495

| [72] | Inventor | William S. Pearson<br>P.O. Box 225, Hampstead, Maryland 21074 |
|---|---|---|
| [21] | Appl. No. | 656,763 |
| [22] | Filed | July 28, 1967 |
| [45] | Patented | Nov. 3, 1970 |

[54] MUSHROOM CUTTING MACHINE
12 Claims, 11 Drawing Figs.

[52] U.S. Cl. .................................................. 146/81, 146/78
[51] Int. Cl. .................................................. A23n 15/00 B26d 4/06
[50] Field of Search ............................................ 146/81, 84, 129.2UX, 78

[56] References Cited
UNITED STATES PATENTS

| 2,638,949 | 5/1953 | Blevins et al. | 146/81 |
| 2,700,821 | 2/1955 | Aberlin | 146/129.2UX |
| 2,806,498 | 9/1957 | Baker | 146/81 |
| 3,164,182 | 1/1965 | Hughes et al. | 146/81 |
| 3,304,973 | 2/1967 | Norris | 146/81 |
| 3,319,680 | 5/1967 | Coleman et al. | 146/81 |
| 3,382,903 | 5/1968 | Kibler et al. | 146/81 |

*Primary Examiner*—Andrew R. Juhasz
*Assistant Examiner*—Z. R. Bilinsky
*Attorney*—Hill, Sherman, Meroni, Gross & Simpson

ABSTRACT: A mushroom cutting machine has continuously running chain link conveyor with driving fingers on which the mushrooms are carried cap up past a root trimmer and then stem severing means.

Patented Nov. 3, 1970

INVENTOR.
William S. Pearson

BY *Hill, Sherman, Meroni, Gross & Simpson*    ATTORNEYS

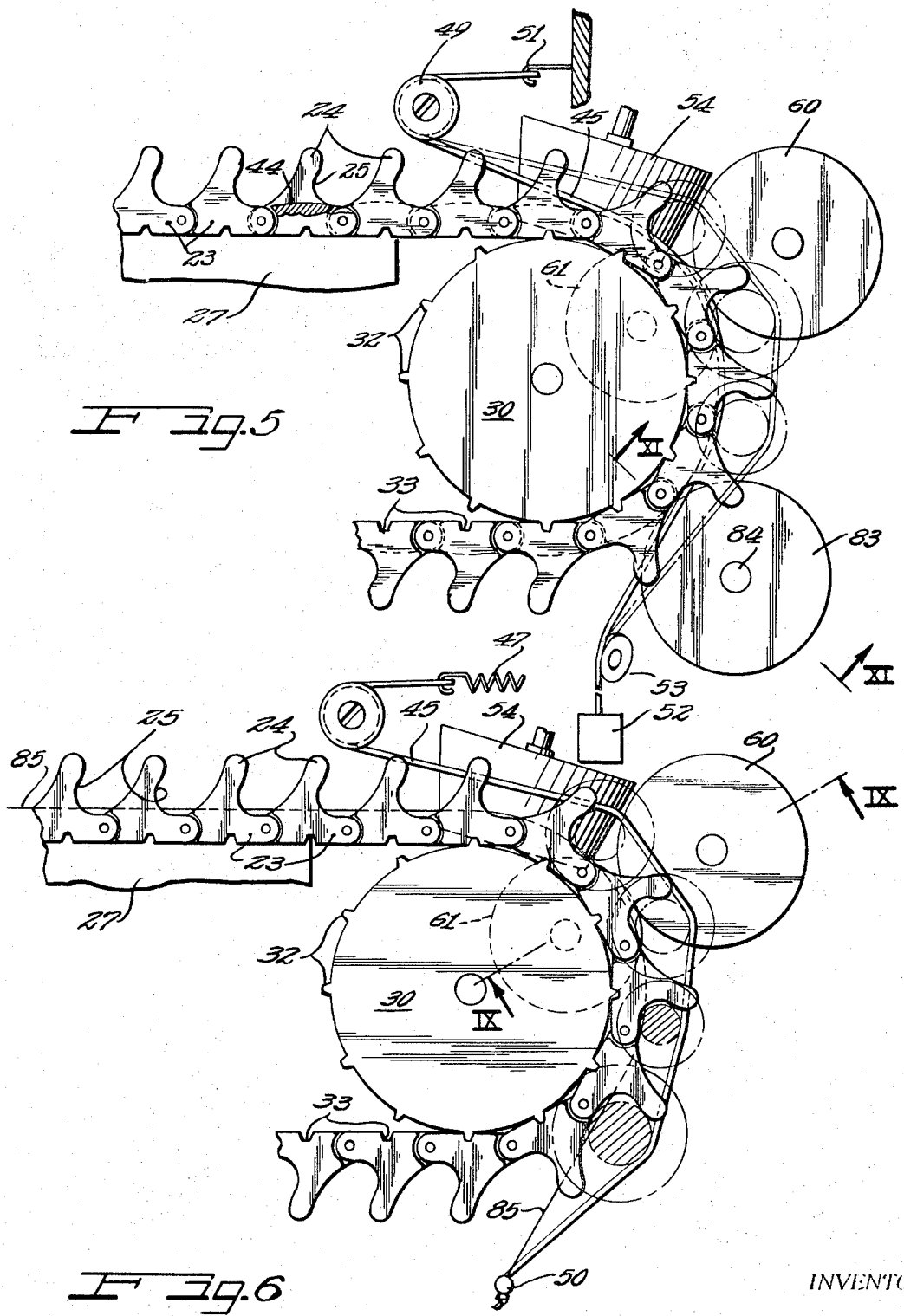

INVENTOR.
William S. Pearson 3,537,495

1

MUSHROOM CUTTING MACHINE

This invention relates to a novel mushroom cutting machine, and more particularly concerns such a machine in which once the mushrooms are loaded into an endless chain conveyor they are root trimmed and the stems severed from the caps or buttons in an automatic sequential operating cycle.

Several mushroom cutting or trimming machines have heretofore been proposed for mushroom canneries, but due to complexities of apparatus, relatively high cost both for the equipment and maintenance, wastage due to various factors not the least of which is the liability to damage the delicate mushroom caps, difficulty to maintain a clean and sanitary condition, and the like, manual processing has heretofore been generally depended upon with all of the inherent limitations on productivity per worker which this entails.

An important object of the present invention is to provide a mushroom cutting machine which overcomes the deficiencies and disadvantages of prior machines, is adapted for relatively high speed operation with assured efficiency, freedom from damaging the mushrooms and affording a high production rate per worker.

Another object of the invention is to provide a mushroom cutting machine which is relatively simple in structure and easy to maintain in a clean and hygienic condition.

A further object of the invention is to provide a novel mushroom cutting machine which is adapted for long operation with minimum servicing.

Still another object of the invention is to provide a mushroom cutting machine which is compact, occupies a minimum of space per worker, is easy to operate and has a large production capacity.

Other objects, features and advantages of the present invention will be readily apparent from certain preferred embodiments thereof taken in conjunction with the accompanying drawings, in which:

FIG. 5 is a fragmentary top plan view of the mushroom conveyor and cutting mechanism showing a modification in the cap and stem severing means;

FIG. 6 is a similar top plan view showing another modification in the cap and stem severing means;

Figure 1:
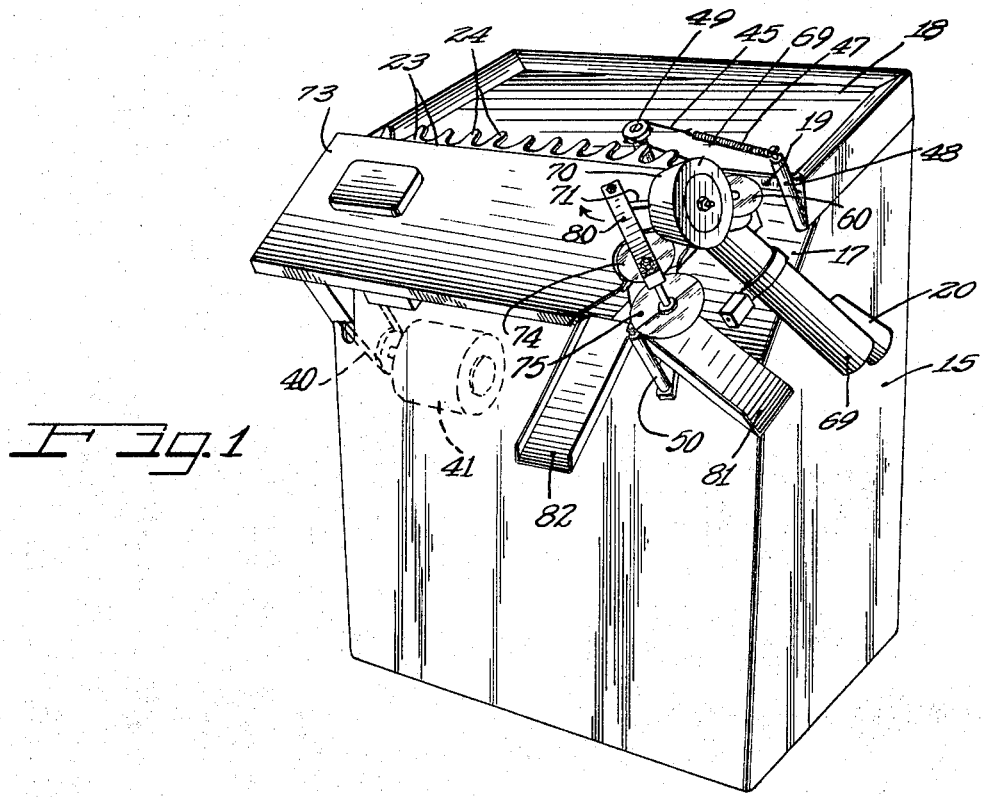
FIG. 1 is a front perspective view of a mushroom cutting machine embodying features of the invention.
Figure 2:
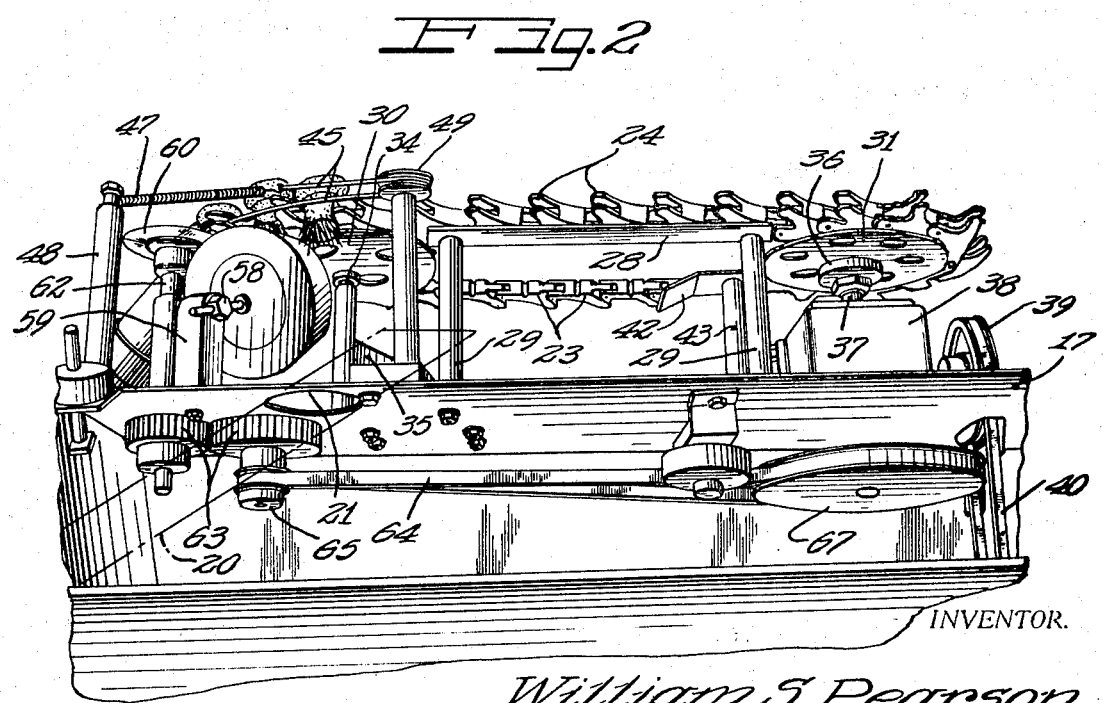
FIG. 2 is a rear elevational view of the upper portion of the machine with certain parts removed for clarity of illustration.

On reference to FIG. 1 a mushroom cutting machine embodying principles of the present invention is shown as mounted on a stand 15 which may be in the form of a floor-length cabinet or console as shown, a frame including legs, or any other cabinet or supporting arrangement. Supported by the stand 15 is a mechanism panel 17 which is preferably disposed in a forwardly and downwardly tilted oblique plane along the top front portion of the stand. For supporting a supply of mushrooms to be processed, a receiving tray 18 is mounted on the upper rear portion of the stand and with its bottom sloping toward the mechanism panel, with a curb 19 along the front of the tray to restrain the mushrooms and hold them conveniently adjacent to the processing apparatus. Dirt and wash water from the tray are adapted to be discharged through a duct 20 (FIGS. 1, 2 and 3) leading away from the front edge of the tray and extending downwardly through an opening 21 in the panel 17 and out through an opening 22 in the adjacent side of the stand.

Figure 7:
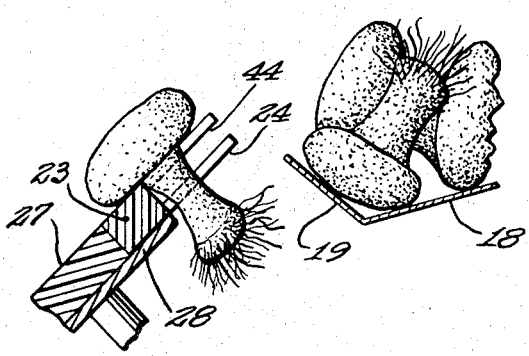
FIG. 7 is a fragmentary sectional elevation detail view taken substantially along the line VII–VII of FIG. 4.

On the mechanism plate 17 is supported a link chain mushroom-supporting conveyor (FIGS. 1–4) comprising a series of mushroom-supporting identical link bodies 23 pivotally connected one to the other into an endless loop and each having a mushroom-advancing finger 24 which is desirably of rounded tip and slightly inclined in the direction of advance and provided with a mushroom stem cradling concave cradle depression 25 in its advancing edge. Means are provided for supporting and driving the conveyor in a plane which is desirably substantially parallel to the forwardly and downwardly titled plane of the supporting panel 17 and comprising an elongated backup bar 27 and connected track flange 28 (FIGS. 2, 4 and 7) in suitable adjacency to the curb edge of the tray 18 to guide a run of substantial length of the conveyor therealong to receive mushrooms with their caps on the upper sides of the respective link bodies 23 and with the stems extending generally downwardly between the fingers 24. Manual loading of the conveyor with mushrooms is thus facilitated. Rigid mounting of the loading guide track on the panel 17 may be effected by means of suitable posts 29. Beyond the right-hand end of the loading rail, the conveyor is trained about a cog wheel 30 and beyond the left-hand end of the track the conveyor is trained about a cog wheel 31. These wheels have respective spaced cogs 32 which engage in respective cog notches 33 in the respective backs of the link bodies 23.

For driving the conveyor in a preferably clockwise direction, means are provided for rotatably driving one of the cog wheels while the other cog wheel rotates idly. In this instance the cog wheel 30 is mounted to rotate idly on a shaft 34 mounted on a bracket 35 carried by the table panel 17. Driving of the cog wheel 31 is effected through a slip clutch 36 mounted on a shaft 37 (FIGS. 2 and 4) journaled in a transmission gear box 38 mounted on the table 17 and which has a pulley 39 drivingly connected by means of a belt 40 to a driving motor 41 (FIG. 1). Although the motor 41 may be an electrical motor of suitable performance characteristics, it maybe any other desirable form of motor such as a hydraulic motor and more particularly a water-driven motor, especially when it is feasible to use the motivating water therefrom in further processing of the mushroom parts as for flushing and flume transport of the mushroom parts from the machine. Between the conveyor cog wheels 30 and 31, the return run of the conveyor may be suitably supported by underlying guide means such as a fixedly mounted slider plate 42 carried by post 43 rising from the panel 17.

After the mushrooms have been loaded on the conveyor and are moved beyond the loading track, the stems are engaged against escape from the supporting articulated sections of the conveyor until released therefrom for discharge from the machine. For this purpose, the conveyor fingers 24 are provided with outwardly opening aligned slots 44 substantially throughout their length and with their bottom or root surfaces on the bodies of the links 23 (FIGS. 2 and 5) and thereby, in effect, providing a continuous groove in the conveyor opening outwardly from the loop thereof. Desirably the root surface of each of the groove slots 44 is of longitudinally convex form on a radius which corresponds to the radius of that portion of the chain which is in motion about at least the pulley or cog wheel 30. Received in the semicylindrical extent of the groove in this portion of the conveyor is a complementary generally looped extent of a yieldably biased mushroom retainer 45 in the form of an elongated flexible element desirably comprising a ribbon or strand having a smooth surface, flexible plastic tubing having been found suitable for the purpose. In one desirable arrangement one end portion of the retaining member 45, preferably that which is nearest the loading track, is resiliently anchored as by means of a coiled expansion spring 47 having one end fixedly connected to a post 48 on the right-hand end portion of the mechanism table or panel 17 and its other end connected to the end portion of the member 45 which is trained over an antifriction member such as a grooved idler wheel 49 so disposed with respect to the conveyor as to maintain in that portion of the member 45 in divergent receiving gap relation to the conveyor for reception of the stems of mushrooms loaded on the conveyor. At its opposite end, the retaining member 45 is anchored to a fixed portion of the machine, in this instance comprising a stud or post 50 (FIGS. 1—4 and 6). Alternatively, a weighted yieldable biasing of the retaining member 45 may be effected as depicted in FIG. 5 wherein the loading end of the member is fixedly anchored to a portion of the machine frame or table, as at 51, then trained about the grooved guide 49, while at its opposite end a biasing weight 52 is attached to the member and a pulley 53 guides the member for yielding under the weight bias. Whether spring biased or weight biased, the retaining member 45 functions to retain the mushrooms on the conveyor as the conveyor travels about the cog wheel 30, by engaging the mushroom stems and holding the same within the finger cradle recesses 25, substantially as shown in dot-dash outline in FIG. 5 and full outline in FIG. 6. Free yielding of the member 45 under its bias permits it to move within the conveyor groove to accommodate any diameter mushroom stem. Through this arrangement, mushrooms are adapted to be freely loaded onto the generally uptilted loading run of the conveyor while it is in continuous operational movement. Then, as the loading run of the conveyor reaches the cog wheel 30 and continues thereabout, the retainer 45, in effect, locks the mushroom stems against outward displacement from the respective pockets provided by the conveyor fingers. Since the retainer 45 is smooth and relatively lightly biased there is freedom from bruising or abrading the mushroom stems under the inward lock-in pressure and sliding engagement on and against the mushroom stems as the mushrooms are transported.

Figure 8:
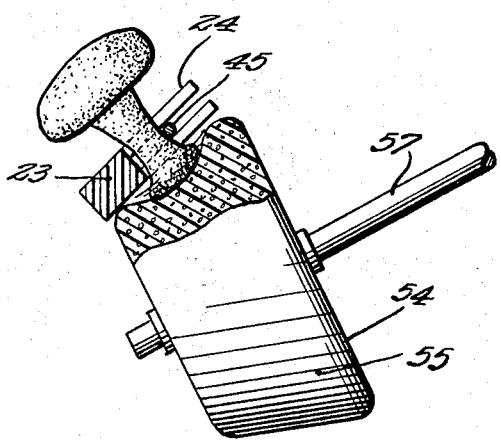
FIG. 8 is a fragmentary sectional elevational detail view taken substantially along the line VIII–VII of FIG. 4.
Figure 9:
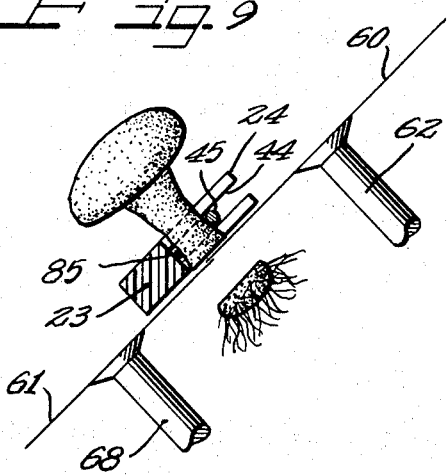
FIG. 9 is a fragmentary sectional elevational detail view taken substantially along the line IX–IX of FIG. 6.

The first processing step to which the mushrooms are subjected as they are transported by the conveyor is trimming off of the root portions of the stems. To this end, immediately after each mushroom has been fully retainingly engaged by the retainer 45, the tip of the stem is engaged and pushed upwardly by means comprising a sponge wheel 54 (FIGS. 2, 3 and 8) which has a tapered pressure perimeter 55 so as to compensate for arcuate travel of the mushroom stems thereby and which is carried rotatably on an axle shaft 57 which is mounted adjustably by a retainer 58 on a post 59 secured to the table 17. The retainer 58 permits adjustment of the sponge wheel 54 both axially and radially for optimum performance in pushing the mushrooms up sufficiently to expose only the root portions of the stems below the conveyor for trimming off by means of cooperating rotary trimming blades 60 and 61 located immediately after the stem-lifting sponge wheel 54. In this instance, the blades 60 and 61 are disks having their cutting edge portions slightly overlapping as shown in FIG. 9 and so disposed as to receive the mushroom stems into the nip thereof as the stems are driven thereinto by the respective conveyor fingers 24. Further, the blades 60 and 61 are disposed closely under the conveyor chain and serve as part of the support for the conveyor, and more particularly as it travels around the cog wheel 30. Desirably the rotary cutter 60 is driven for positive, clean cut trimming of the root portions from the remainder of the stem, and for this purpose is corotatively mounted on a spindle 62 suitably supported on the table 17 and driven from the gear box 38 through means such as a set of gears 63 (FIG. 2), a drive belt 64 trained over a set of speed increasing pulleys 65 and 67 connected to the gear train and the gear box transmission, respectively. While the cutting blade 61 may be driven, it is preferably mounted on an idler spindle 68. As the root portions of the mushrooms are trimmed off, they drop into the mouth of a suitable downwardly and outwardly directed tubular chute 69 which discharges into any suitable receptacle.

Figure 10:
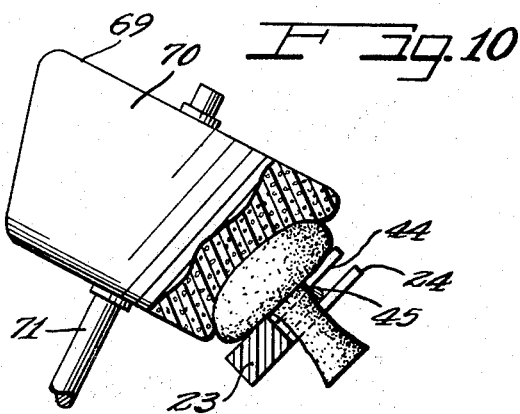
FIG. 10 is a fragmentary sectional elevational detail view taken substantially along the line X–X of FIG. 3.

Immediately after root trimming the mushrooms are pressed down so that the caps again abut the conveyor and the trimmed stems project downwardly. Pressing down is effected by means of a sponge wheel 69 (FIGS. 1, 3 and 10) which operates in superposed relation to the conveyor and has a tapered pressing perimeter 70 which compensates for the arcuate path of movement of the mushrooms hereby. In a desirable arrangement, the sponge wheel 69 is mounted in freely rotatable relation on a shaft arm 71 secured to a bracket 72 supported on a cover plate 73 mounted over the nonfunctioning portions of the conveyor.

Figure 3:
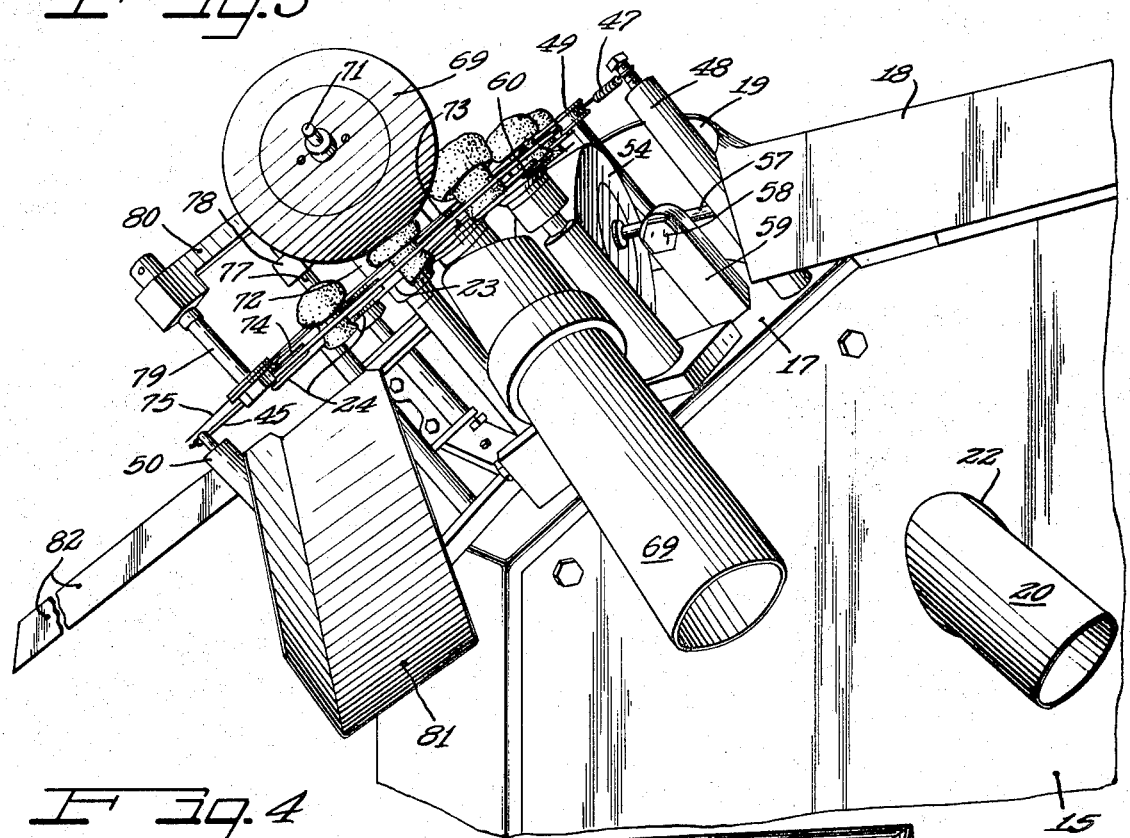
FIG. 3 is a fragmentary side elevational view of the machine.
Figure 4:
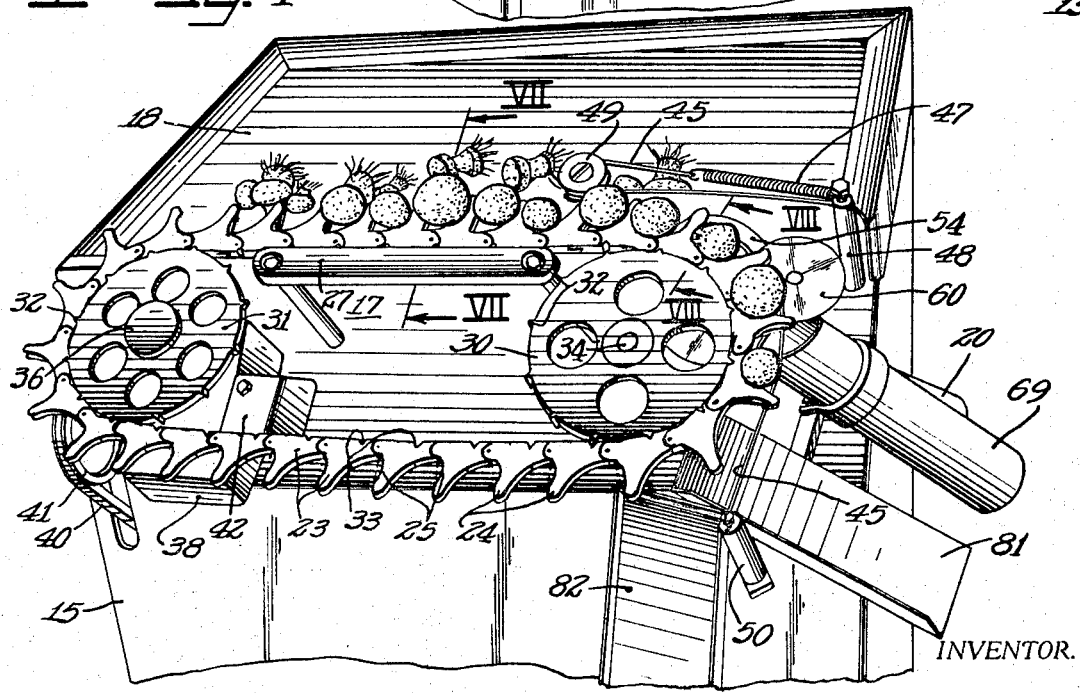
FIG. 4 is a top perspective view of the machine with certain parts removed for purposes of illustration.
Figure 11:
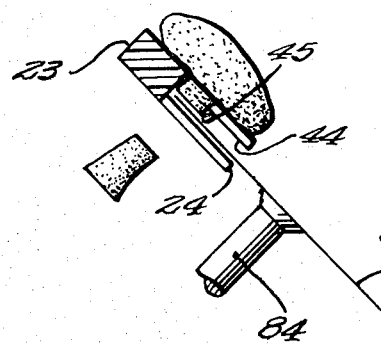
FIG. 11 is a fragmentary sectional elevational detail view taken substantially along the line XI–XI of FIG. 5.

Immediately after the trimmed mushrooms have been pressed down, the trimmed stems are severed from the caps. In one way of accomplishing this, a pair of cooperating rotary disk cutting blades 74 and 75 is provided in overlying parallel relation to the conveyor (FIGS. 1 and 3). Although one or both of the cutters 74 and 75 may be driven, it has been found satisfactory to permit them to be rotary idlers located so that the mushrooms are advanced by the conveyor and driven into the nip of slightly overlapping cutting edge portions of the knife blade disks. For this purpose the knife blade 74 is mounted on a rotary shaft 77 journaled on an overhanging cantilever arm 78 of the bracket 72 and along the inner side of the path along which the mushrooms are transported by the conveyor, while the cutting blade 75 is mounted on a rotary shaft 79 journaled on a cantilever arm 80 of the bracket and disposed along the outer side of the path of movement of the mushrooms. Desirably the arm 80 is adapted to be swung out of the cutting position over the cover plate 73, as indicated by the directional arrow in FIG. 1, for cleaning and servicing purposes. As the stems are severed from the caps, they are released to drop into a chute 81 which diverts them into any suitable receptacle or flume. The severed caps slide off the conveyor into a chute 82 which diverts them into any suitable receptacle or flume.

Where it is desired to retain a short portion of the stems attached to the caps, a stem-severing arrangement as indicated in FIGS. 5 and 11 may be employed, in which a rotary severing knife blade 83 is rotatably mounted on a shaft or spindle 84 and extends into the groove provided by the conveyor finger slots 44 under the retainer 45 and with the cutting edge cooperating with the root surfaces within the grooves 44 to sever the stems which drop off into the chute 81 while the mushroom cap and the short attached portion of the stem move on and are promptly released from the retainer 45 which diverges from the conveyor at that point so that the caps drop off into the chute 82.

Still another means for severing the stems from the caps and accomplishing the same result as depicted in FIG. 11, namely, leaving a short length of the stem attached to the cap, is depicted in FIG. 6. In this arrangement instead of a severing knife structure, a thin severing wire 85 is provided which is anchored to the post 50 at one end and runs along the root of the conveyor groove and is suitably anchored at its opposite end ahead of the loading run of the conveyor. Through this arrangement, as the mushrooms are advanced after trimming the stems are pushed by the respective conveyor fingers against the diverging severance wire 85 as the conveyor moves into its return run around the cog wheel 30. In this instance, again, the severed stem portions drop off into the chute 81 and the caps and attached short portions of the stems drop off into the chute 82.

As will be observed, all of the mushroom handling and processing parts of the machine are readily accessible for cleaning so that the machine may at all times be maintained in a sanitary condition. By having the conveyor chain links made from suitable plastic material such as nylon, not only is the sanitary condition enhanced, but frictional drag of the conveyor on supporting or relatively movable parts is minimized. Other parts of the operating mechanism may be made from stainless steel or aluminum. If preferred, the synthetic plastic sponge wheels 54 and 69 may be, instead, inflated tubular wheels.

Whereas the average production of experienced operators cutting the mushrooms manually is on the order of about 72 lbs. an hour it has been found that the present machine even with an inexperienced operator will process on the order of 180 lbs. an hour and provide much greater uniformity, with less waste, and less damage to the mushrooms than by hand cutting.

It will be understood that variations and modifications may be effected without departing from the spirit and scope of the novel concepts of this invention.

I claim:
1. In a mushroom cutting machine:
   a mechanism support tilted downwardly and forwardly;
   cog wheels rotatably mounted in a common plane substantially parallel to said support on axes spaced apart horizontally and driving means rotatably driving one of said cog wheels;
   a link chain mushroom-supporting conveyor trained onto and about said cog wheels to be driven in one direction by the driving of said one cog wheel and comprising a series of articulated sections having mushroom-supporting link bodies pivotally connected one to the other into an endless loop and each having a mushroom-advancing finger projecting outwardly relative to the loop;
   a length of said conveyor extending between said cog wheels with a supporting and backing up loading track therealong and having said fingers extending generally upwardly and rearwardly;
   mushroom supply means located adjacent to said length of the conveyor and from which the mushrooms are supplied to said conveyor with the mushroom caps resting on the sections and the stems projecting downwardly for engagement by said fingers to be moved with the conveyor in its driven direction;
   said fingers having aligned slots defining a groove opening outwardly from the conveyor loop;
   a flexible strand mushroom retainer converging toward the conveyor adjacent to said loading track and engaged in said groove and extending with the conveyor in the direction of its driven movement around one of said cog wheels and at its opposite end portion diverging from the conveyor;
   means mounted to be operative under the conveyor adjacent to convergence of said retainer with the conveyor for trimming off root portions of the stems as they are advanced successively thereby;
   a closure plate over the nonoperating portions of the conveyor and cog wheels; and
   means for severing the trimmed mushrooms stems from the caps and supported on said closure plate adjacent to divergence of said strand from the conveyor.

2. A machine according to claim 1, said mushroom supply means comprising a tray which is tilted generally toward said support and has a mushroom-restraining curb thereon adjacent to said track, and a discharge duct leading from the lower edge portion of the tray to receive dirt and wash water from the tray.

3. A machine according to claim 1, said trimming means being located at a position after the conveyor is traveling an arcuate path about said one cog wheel around which the flexible strand is disposed, a roller pressing upwardly on the mushroom stems under the conveyor and adjacently ahead of said trimming means for locating the root portions of the stems for trimming and having a frustoconical perimeter to compensate for the arcuate travel of the mushroom stems with the conveyor.

4. A machine according to claim 1, including means for pressing the mushroom stems upwardly to orient the root portions for trimming, and a presser roller mounted to engage the mushroom caps while the mushrooms are moving in an arcuate path with said cog wheel about which said retaining strand extends for pressing the mushrooms downwardly after the trimming means and before the severing means and having a frustoconical mushroom-engaging periphery to compensate for the arcuate travel of the mushrooms while being pressed down.

5. A machine according to claim 4, including means supporting said roller on said closure plate.

6. A machine according to claim 1, said trimming means comprising disk knife blades and means relatively rotatably mounting said knife blades in slightly overlapping relation with the nip aligned with the mushroom stems to receive the stems therein in the driven movement of the conveyor, blades being disposed closely under the conveyor after the conveyor has left said track and assisting in supporting the conveyor.

7. In a mushroom cutting machine:
   a link chain mushroom-supporting conveyor comprising a series of articulated sections having mushroom-supporting link bodies pivotally connected one to the other into an endless loop and each having a mushroom-advancing finger projecting outwardly relative to the loop, said chain loop being elongated in side-to-side direction and disposed in an upwardly tilted plane with its width extending at an oblique angle to the horizontal with a length of the conveyor at the top of the tilt;
   means for supporting and for driving said conveyor in one direction with one side of said conveyor facing generally upwardly to carry mushrooms cap-up on said link bodies and stem-down in said fingers;
   means located along the conveyor for trimming off root portions of the mushrooms as they are advanced successively thereby;
   means for severing the trimmed mushroom stems from the caps;
   said fingers having aligned slots defining a groove running continuously around the conveyor on the outer side of said loop;
   an elongated flexible retainer extending along that portion of the conveyor adjacent to said trimming means in said groove and operating to engage the mushroom stems for retaining the mushrooms against escape outwardly from the conveyor;
   said retainer converging toward said conveyor ahead of said trimming means and having biasing means attached to the adjacent end thereof normally urging the retainer into said groove but enabling yielding of the retainer to accommodate the thickness of mushroom stems engaged between the retainer and the respective conveyor sections; and
   said severing means comprising a wire located within said groove to receive the mushroom stems between the wire and the retainer, with said wire and said retainer converging together in generally divergent relation relative to the conveyor and beyond said trimming means and having their ends fixedly mounted whereby the conveyor fingers push the mushroom stems severingly across said wire with the retainer cooperating to prevent escape of the mushroom stems from the severing relation to said wire.

8. In a machine according to claim 1, each of said section bodies having a cog-receiving notch in its back and opening in the opposite direction from the direction in which the respective finger of the section projects.

9. In a mushroom cutting machine:
   an endless loop chain mushroom-supporting conveyor elongated in side-to-side direction and disposed in an upwardly tilted plane in its width extending at an oblique angle to the horizontal with a length of the conveyor at the top of the tilt;
   said conveyor comprising a series of articulated sections having mushroom-supporting link bodies pivotally connected one to the other;
   each of said sections having a mushroom-advancing finger projecting outwardly relative to the loop and a back edge facing inwardly relative to the loop and provided with a respective cog-receiving notch;
   said fingers being directed in a generally upward direction in said plane in said top-of-the-tilt length of the conveyor;
   spaced cog wheels within the loop engaging with said notches within end portions of the conveyor loop;

a loading track against which the back edges of said sections in said top-of-the-tilt length of the conveyor are backed up and also having means supporting such length of the conveyor by engagement of the undersides of the sections therewith;

mushroom supply means extending along and toward said length of the conveyor and from which mushrooms are loaded onto the respective sections in said length as they run in supported relation along said track and with the caps of the mushrooms resting on the upper sides of said sections and the stems extending downwardly and engaged by and advanced by the fingers of said sections;

means, mounted beyond the end of said track in the direction of movement of the conveyor and associated with the cog wheel about which said conveyor travels after leaving said track, for trimming off root portions from the stems of the mushrooms; and means for thereafter severing the caps from the stems.

10. A machine according to claim 9, said mushroom supply means comprising a tray tilted toward said length of the conveyor and having a curb along the lower edge of the tray extending along and adjacent to said length, and a discharge from the lower edge of said tray at said curb for carrying off dirt and wash water from the tray.

11. A machine according to claim 9, said trimming means comprising disk knife blades and means relatively rotatably mounting said knife blades in slightly overlapping relation with the nip aligned with the mushroom stems to receive the stems therein in the advancing movement of the conveyor, said blades being disposed closely under the conveyor beyond said track and assisting in supporting the conveyor.

12. In a machine according to claim 9, each of said sections comprising a one-piece body and finger construction.